(12) United States Patent
Shin et al.

(10) Patent No.: US 12,030,982 B2
(45) Date of Patent: Jul. 9, 2024

(54) POLYESTER RESIN HAVING IMPROVED ADHESION STRENGTH FOR BINDER AND POLYESTER FIBER USING SAME

(71) Applicant: HUVIS CORPORATION, Seoul (KR)

(72) Inventors: Hyun Wook Shin, Daejeon (KR); Min Sung Lee, Daejeon (KR); Sung Yeol Kim, Daejeon (KR); Seong Yoon Park, Daejeon (KR)

(73) Assignee: HUVIS CORPORATION, Seoul (KR)

( * ) Notice: Subject to any disclaimer, the term of this patent is extended or adjusted under 35 U.S.C. 154(b) by 380 days.

(21) Appl. No.: 17/297,900

(22) PCT Filed: Nov. 7, 2019

(86) PCT No.: PCT/KR2019/015041
§ 371 (c)(1),
(2) Date: May 27, 2021

(87) PCT Pub. No.: WO2020/111563
PCT Pub. Date: Jun. 4, 2020

(65) Prior Publication Data
US 2022/0041801 A1    Feb. 10, 2022

(30) Foreign Application Priority Data

Nov. 30, 2018 (KR) .......... 10-2018-0152307
Dec. 21, 2018 (KR) .......... 10-2018-0167699

(51) Int. Cl.
| | | |
|---|---|---|
| *C08G 63/183* | (2006.01) | |
| *D01F 8/14* | (2006.01) | |
| *D04H 1/435* | (2012.01) | |
| *D04H 1/4382* | (2012.01) | |

(52) U.S. Cl.
CPC ............ *C08G 63/183* (2013.01); *D01F 8/14* (2013.01); *D04H 1/435* (2013.01); *D04H 1/43828* (2020.05)

(58) Field of Classification Search
CPC ..... D01F 8/14; D01F 6/62; F01F 6/62; C08G 63/183; C08G 63/16; C08G 63/181; D04H 1/435; D04H 1/43828; D04H 1/5412; D04H 1/55
See application file for complete search history.

(56) References Cited

U.S. PATENT DOCUMENTS 4,557,972 A * 12/1985 Okamoto ................. D04H 1/50
                                                      428/397
5,380,816 A    1/1995 Sullivan
5,593,778 A *  1/1997 Kondo ..................... D01F 8/14
                                                      428/373

FOREIGN PATENT DOCUMENTS

| CN | 101291974 A | * 10/2008 | .......... C08G 63/183 |
| JP | 2001089647 A | 4/2001 | |
| KR | 20150121418 A | 10/2015 | |
| KR | 20160024184 A | 10/2015 | |
| KR | 20180079347 A | 7/2016 | |
| WO | WO-2011038671 A1 | * 4/2011 | .......... C08G 63/672 |
| WO | WO-2017150747 A1 | * 9/2017 | .......... C08G 63/183 |

OTHER PUBLICATIONS

English machine translation of WO 2011038671.*
Bouma, Krista et al., Crystallization of Poly(ethylene Terephthalate) Modified with Codiols, Journal of Applied Polymer Science, vol. 80, Issue 14, 2001.*

* cited by examiner

*Primary Examiner* — Jennifer A Gillett
(74) *Attorney, Agent, or Firm* — Weiss & Moy, PC; Jeffrey D. Moy

(57) ABSTRACT

The present invention relates to a polyester resin for an adhesive strength-improved binder and a polyester fiber using the same, in which adhesive properties of the polyester resin for the adhesive strength-improved binder are not lowered at high temperatures since melt viscosity even at high temperatures of the polyester resin for the adhesive strength-improved binder, as a polyester resin for a binder, the polyester resin including terephthalic acid or an ester-forming derivative thereof as an acid component and including 2-methyl-1,3-propanediol, 2-methyl-1,3-pentanediol, and ethylene glycol as diol components, is not greatly lowered.

3 Claims, No Drawings

POLYESTER RESIN HAVING IMPROVED ADHESION STRENGTH FOR BINDER AND POLYESTER FIBER USING SAME

BACKGROUND OF THE INVENTION

1. Field of the Invention

The present invention relates to a polyester resin for an adhesive strength-improved binder and a polyester fiber using the same. More particularly, the present invention relates to a polyester resin for a processability-improved binder having excellent thermal adhesive properties and improved spinning processability.

2. Description of the Related Art

Polyester can be used in various fields requiring light weight and high physical properties since polyester, as an eco-friendly material, has superior mechanical properties and is excellent in heat resistance, chemical resistance, etc. Role of a polyester fiber represented by polyethylene terephthalate (PET) in a fiber field including nonwoven fabric and the like has recently been grown. A specific example is that a demand for thermo-adhesive fibers usable in a clothing adhesion core, an automobile interior material or the like including a polyester resin as an adhesive component has been increased.

Accordingly, an effort for expanding utilization of the polyester fiber by improving physical properties of the polyester fiber has been proceeded from various angles, and techniques for controlling temperatures including softening point, glass transition temperature, and the like by modifying structure of a polyester resin have been studied as part of such an effort. For example, techniques for adjusting melting point or glass transition temperature of the polyester resin by copolymerizing dicarboxylic acid such as terephthalic acid, isophthalic acid, adipic acid, sebacic acid, or the like and a diol compound such as ethylene glycol, neopentyl glycol, or the like have been developed.

Particularly, when manufacturing a web or sheet of nonwoven fabric using the polyester fiber, a thermal bonding binder polyester fiber which is used to bond a filaments or short staples has a thermal bonding processing temperature of 120 to 200° C., and should have low melting point or softening point compared to a general polyethylene terephthalate fiber.

To this end, a representative method of synthesizing the polyester resin includes copolymerizing isophthalic acid as a copolymerization component with terephthalic acid. At this time, isophthalic acid is added in an amount of 20 to 45 mol % with respect to mole. Since such synthesized polyester resin has a molecular structure with an amorphous form, the polyester resin exhibits a final melting point range of 145 to 180° C., and may be used as a polyester fiber for a binder.

Although U.S. Pat. No. 4,129,675 discloses a low melting point polyester binder including terephthalic acid and isophthalic acid as main components, the low melting point polyester binder is uneconomical since the low melting point polyester binder requires a temperature of 200° C. or more during thermal bonding.

Although U.S. Pat. No. 4,166,896 discloses a method for producing an unsaturated polyester by copolymerizing a low molecular material obtained by depolymerization of polyester with unsaturated dicarboxylic acid or the like, a fiber according to the patent not only has low economic efficiency, but also has disadvantages of excessively high melting point and high crystallinity when the unsaturated polyester is used as a binder.

Although U.S. Pat. No. 4,065,439 discloses a low melting point polyester obtained by using terephthalic acid/isophthalic acid/adipic acid (or sebacic acid) and ethylene glycol/neopentyl glycol, the binder not only makes it difficult to be used as a clothing interlining, but also has weak shape stability under high temperature conditions since the binder has a too low melting point of 45 to 60° C.

Meanwhile, although Korean Patent Laid-Open Publications No. 2001-11548 provides a binder for a polyester-based fiber, the binder which has excellent adhesive force with polyester and does not allow a yellowing phenomenon to occur after bonding by condensation polymerizing dicarboxylic acid components of terephthalic acid and phthalic anhydride with diol components of ethylene glycol and diethylene glycol, the binder has a complicated reaction mechanism since phthalic anhydride is directly used in the binder, and the binder has disadvantage that a condensation polymerization temperature should be lowered to prevent a problem that color of a copolymerized polyester becomes defective accordingly. Further, such a condensation polymerization reaction at low temperatures may have a problem of lowering operation productivity.

Further, in case of a low melting point material used in a sheath part when generally manufacturing a sheath-core type low melting point thermal bonding fiber, it is general to proceed the spinning process in a state that an extruder is set to a low temperature during a spinning process compared to a general polyester resin of a core part due to a low melting point (or softening point) of the low melting point material.

In this case, although there is an extruder temperature difference of about 30 to 50° C. between the sheath part and the core part, two polymers pass through the extruder, flowability of a general polyester resin having a high melting point in a nozzle unit is controlled to perform the spinning process, and the extruder is set to a high temperature of 280° C. or higher to prevent solidification of the polyester resin.

As described above, there has been a problem that, since a polyester resin of the sheath part melted to high temperatures in the nozzle unit, as a low melting point material, has a rapidly dropped melt viscosity, flowability of the polyester resin is excessively increased to cause fiber cross-sectional nonuniformity (eccentricity or the like), deteriorate processability such as bending, cutting or the like during the spinning process, and deteriorate uniformity in physical properties of a polyester fiber manufactured.

SUMMARY OF THE INVENTION

The present invention has been invented to solve the above-mentioned problems, and an object of the present invention is to provide a polyester resin for an adhesive strength-improved binder, the polyester resin of which adhesive force is not lowered at high temperatures since melt viscosity of the polyester resin is not greatly lowered even at high temperatures.

Further, another object of the present invention is to provide a polyester resin for an adhesive strength-improved binder, the polyester resin of which spinning processability is improved since melt viscosity of the polyester resin is not greatly lowered even at high temperatures when manufacturing the polyester resin into a fiber.

Further, still another object of the present invention is to provide a polyester fiber for a processability-improved binder, the polyester fiber of which processability in the spinning process is improved since melt viscosity of a polyester resin for forming a sheath part is not greatly lowered even at high temperatures when manufacturing a sheath-core type polyester fiber for a binder.

Further, another object of the present invention is to provide a polyester fiber for a processability-improved binder, the polyester fiber of which processability is improved such that the polyester fiber has uniform physical properties and improved adhesive force.

The present invention provides a polyester resin for a binder, the polyester resin including terephthalic acid or an ester-forming derivative thereof as an acid component and including 2-methyl-1,3-propanediol, 2-methyl-1,3-pentanediol, and ethylene glycol as diol components.

Further, 2-methyl-1,3-propanediol in the diol components is contained in an amount of 0.01 to 5 mol % in the diol components.

In addition, the polyester resin for the binder has a melt viscosity difference of 600 poises or less between 220° C. and 260° C.

Moreover, the polyester resin for the binder has a melt viscosity at 260° C. of 600 to 1,500 poises.

Furthermore, the present invention provides a polyester fiber including the polyester resin for the binder.

Furthermore, the present invention provides a polyester fiber for a processability-improved binder, as a polyester fiber for a binder formed of a sheath part and a core part, the polyester fiber characterized in that the core part is formed of a general polyester resin, and the sheath part is formed of a polyester resin for a binder, the polyester resin including an acid component included of terephthalic acid or an ester-forming derivative thereof and diol components included of 2-methyl-1,3-propanediol, 2-methyl-1,3-pentanediol, and ethylene glycol.

Further, 2-methyl-1,3-propanediol of the polyester resin for the binder is contained in an amount of 0.05 to 2 mol % in the diol components.

In addition, the general polyester resin of the core part has a melt viscosity at 280° C. of 2,000 to 4,000 poises, and the polyester resin for the binder of the sheath part has a melt viscosity at 260° C. of 600 to 1,500 poises.

Furthermore, the present invention provides a nonwoven fabric including the polyester fiber for the binder.

As described above, a polyester resin for an adhesive strength-improved binder according to the present invention has an adhesive strength improving effect since melt viscosity of the polyester resin is not greatly lowered even at high temperatures such that adhesive force of the polyester resin is not lowered at high temperatures.

Further, a fiber including a polyester resin for a binder according to the present invention has an effect of greatly improving spinning processability by suppressing phenomena such as cross-sectional nonuniformity, bending, cutting and the like in spinning process since melt viscosity of the polyester resin for the binder is not greatly lowered even at high temperatures when manufacturing the fiber.

In addition, the sheath-core type polyester fiber has an effect of greatly improving the spinning processability by suppressing phenomena such as cross-sectional nonuniformity, bending, cutting and the like in the spinning process since melt viscosity of the polyester resin for the binder which forms the sheath part is not greatly lowered even at high temperatures when manufacturing a sheath-core type polyester fiber.

Further, a polyester fiber for a processability-improved binder has an effect of having uniform physical properties and improved adhesive force by improving processability of the polyester fiber.

DETAILED DESCRIPTION OF THE PREFERRED EMBODIMENT

Hereinafter, preferred embodiments of the present invention will be described in detail. Also, it should be understood that detailed descriptions of well-known functions and structures related to the present invention will be omitted so as not to unnecessarily obscure the important point of the present invention.

When unique manufacture and material allowable errors of numerical values are suggested to mentioned meanings of terms of degrees used in the present invention such as "about", "substantially", etc., the terms of degrees are used as the numerical values or as a meaning near the numerical values, and the terms of degrees are used to prevent that an unscrupulous infringer unfairly uses a disclosure content in which extract or absolute numerical values are mentioned to help the understanding of the present invention.

The present invention relates to a polyester resin for a binder, the polyester resin including terephthalic acid or an ester-forming derivative thereof as an acid component and including 2-methyl-1,3-propanediol, 2-methyl-1,3-pentanediol, and ethylene glycol as diol components.

2-methyl-1,3-propanediol, i.e, a diol component among the diol components in the present invention facilitates rotation of a polymer main chain by coupling a methyl group to a second carbon and is acted as a polymer end portion to increase the entire flow probability of a polymer chain by widening a free space between main chains. Accordingly, 2-methyl-1,3-propanediol allows a polymer to become amorphous and has the same thermal properties as isophthalic acid. 2-methyl-1,3-propanediol performs a role of improving tearing properties during binding of nonwoven fabric by improving elasticity due to a flexible molecular chain existing in the polymer main chain.

Namely, softening point (Ts) and/or glass transition temperature (Tg) of 2-methyl-1,3-propanediol can be adjusted by securing a space enabling rotation of a main chain of a resin polymerized by including a methyl ($—CH_3$) group as a side chain in an ethylene chain coupled to terephthalate, thereby inducing an increase in the degree of freedom of the main chain and a drop in crystallinity of the resin. 2-methyl-1,3-propanediol can exhibit the same effect as isophthalic acid (IPA) containing an asymmetrical aromatic ring to lower crystallinity of a conventional crystalline polyester resin.

2-methyl-1,3-pentanediol, i.e, another diol component among the diol components in the present invention facilitates rotation of a polymer main chain and has characteristics of giving low melting point properties to a polyester resin by coupling a methyl group to a second carbon as in the 2-methyl-1,3-propanediol, and prevents melt viscosity from rapidly being lowered at high temperatures while increasing melt viscosity of the polyester resin by having a longer molecular chain than 2-methyl-1,3-propanediol.

It will be preferable that 2-methyl-1,3-propanediol of the polyester resin for the binder is contained in an amount of 20 to 50 mol % in the diol components in order to improve low melting point properties and adhesive force of a polyester resin for a binder according to the present invention, the polyester resin formed of the above-mentioned dial components.

A melt viscosity-improving effect is insignificant when 2-methyl-1,3-pentanediol is contained in an amount of less than 0.01 mol % in the diol components while melt viscosity is rapidly increased such that spinning processability may be deteriorated when the 2-methyl-1,3-pentanediol is contained in an amount of more than 5 mol % in the dial components. Therefore, it will be preferable that the 2-methyl-1,3-pentanediol is contained in an amount of 0.01 to 5 mol % in the diol components.

It will be most preferable that the 2-methyl-1,3-pentanediol is contained in an amount of 0.05 to 2 mol %.

A polyester resin for a binder according to the present invention, the polyester resin containing the above-mentioned 2-methyl-1,3-pentanediol has characteristics that melt viscosity of the polyester resin is not rapidly lowered at high temperatures by having a melt viscosity difference of 600 poises or less between 220° C. and 260° C.

It is preferable that the lower the melt viscosity difference between 220° C. and 260° C. of a polyester resin for a binder according to the present invention is, and it will be more preferable that a polyester resin for a binder according to the present invention has a melt viscosity difference of 500 poises or less between 220° C. and 260° C.

Further, since a polyester resin for a binder according to the present invention can prevent deterioration of adhesive properties due to lowering of melting point at high temperatures when melt viscosity is high at high temperatures, it is preferable that a polyester resin for a binder according to the present invention has a melt viscosity at 260° C. of 600 to 1,500 poises, and it will be more preferable that a polyester resin for a binder according to the present invention has a melt viscosity at 260° C. of 700 poises or more.

The above-mentioned polyester resin for the adhesive strength-improved binder according to the present invention may have excellent physical properties including a softening point of 100 to 150° C., a glass transition temperature of 50 to 90° C., and an intrinsic viscosity of 0.50 dl/g or more by containing 2-methyl-1,3-propanediol and 2-methyl-1,3-pentanediol as described above.

A fiber may be formed by using the above-mentioned polyester resin for the adhesive strength-improved binder according to the present invention.

A fiber including a polyester resin for a binder according to the present invention may be formed by performing a single spinning process of the polyester resin for the binder according to the present invention, and a sheath-core type composite fiber may be formed through a composite spinning process by using the polyester resin for the binder according to the present invention in the sheath part and using the general polyester resin in the core part.

Although the general polyester resin forming the core part may include any polyester resins, the general polyester resin preferably includes a polyethylene terephthalate (PET) resin produced from terephthalic acid and ethylene glycol.

In order for a sheath-core type polyester fiber for a binder according to the present invention to obtain spinning properties of a composite fiber in the spinning process, it is preferable that the general polyester resin of the core part has a melt viscosity at 280° C. of 2,000 to 4,000 poises, and the polyester resin of the sheath part has a melt viscosity at 260° C. of 500 to 1,500 poises.

A cutting phenomenon may occur since spinning processability is lowered when melt viscosity of the general polyester resin of the core part is too high, while shape stability of the composite fiber may be deteriorated when melt viscosity of the core part is lower than that of the polyester resin of the sheath part. Namely, since the fiber may not be formed in a sheath-core type cross-sectional shape, it will be preferable that the general polyester resin of the core part has a melt viscosity at 280° C. of 2,000 to 4,000 poises.

Shape stability of the composite fiber may be deteriorated when melt viscosity of the polyester resin of the sheath part is too high, and cross-sectional nonuniformity, bending phenomenon, cutting phenomenon, or the like of the composite fiber may occur when melt viscosity of the polyester resin of the sheath part is too low. Therefore, the polyester resin of the sheath part preferably has a melt viscosity at 260° C. of 500 to 1,500 poises and more preferably has a melt viscosity at 260° C. of 700 poises or more.

Improvements in shape stability and spinning processability of the composite fiber are advantageous when there is a predetermined melt viscosity range difference between the general polyester resin forming the core part and the polyester resin for the binder forming the sheath part. It is preferable that there is a melt viscosity difference of 700 to 2,500 poises between 280° C. of the general polyester resin forming the core part and 260° C. of the polyester resin for the binder forming the sheath part, and it is more preferable that there is a melt viscosity difference of 1,000 to 2,000 poises between 280° C. of the general polyester resin forming the core part and 260° C. of the polyester resin for the binder forming the sheath part.

Processability of the composite fiber is improved to obtain uniform physical properties and improved adhesive force of the fiber since there is not a large melt viscosity difference between the sheath part and the core part when manufacturing the composite fiber by using a polyester resin for a binder according to the present invention as described above.

Further, a polyester fiber for a binder, the polyester fiber containing a polyester resin, according to the present invention not only can be thermally bonded, but also has improved adhesive force in a low temperature range similar to a temperature applied to an existing binder fiber.

Further, a polyester fiber for a binder according to the present invention has advantages that the polyester fiber not only maintains strong force even when durability and shape stability under a high temperature atmosphere are required in material such as an automobile interior material product, but also can prevent a sagging phenomenon under a high temperature atmosphere in a nonwoven fabric for molding by maintaining a glass transition temperature of 60° C. or more. Therefore, the polyester fiber for the binder according to the present invention can be used in a nonwoven fabric for various purposes.

Hereinafter, Examples of methods of manufacturing a polyester resin and polyester fiber for a processability-improved binder according to the present invention will be described. However, the present invention is not limited to the Examples.

Examples 1 to 6

Polyester fibers for processability-improved binders according to the present invention were manufactured through a general composite spinning process by using polyethylene terephthalate having a melt viscosity at 280° C. of about 2,300 poises as the core part and using polyester resins for binders as the sheath part, thereby maintaining a weight ratio of the sheath part to the core part of 50:50.

Polyethylene terephthalate polymers (PET oligomers) with a reaction rate of about 96% were manufactured by injecting terephthalic acid (TPA) and ethylene glycol (EG) into an ester reaction tank and carrying out a usual polymerization reaction at 258° C. Reaction mixture were obtained by containing about 42 mol % of 2-methyl-1,3-propanediol in the manufactured polyethylene terephthalate (PET) with respect to the diol components, mixing 2-methyl-1,3-pentanediol with 2-methyl-1,3-propanediol contained in the manufactured polyethylene terephthalate (PET) at an amount ratio represented by the following Table 1, and adding a transesterification reaction catalyst to the mixture, thereby performing a transesterification reaction process at 250±2° C. Thereafter, the above-mentioned polyester resins for the binders were manufactured by adding a condensation polymerization reaction catalyst to the obtained reaction mixture and performing a condensation polymerization reaction process while adjusting final temperature and pressure within the reaction tank such that the final temperature and pressure became 280±2° C. and 0.1 mmHg, respectively.

Comparative Example 1

A polyester fiber for a processability-improved binder according to the present invention was manufactured in the same manner as in Example 1 by using polyethylene terephthalate as the core part, and using a polyester resin for a binder of the sheath part, the polyester resin including 66.5 mol % of terephthalic acid and 33.5 mol % of isophthalic acid as an acid component and 10.5 mol % of diethylene glycol and 89.5 mol % of ethylene glycol as diol components.

Comparative Example 2

A polyester fiber for a processability-improved binder according to the present invention was manufactured in the same manner as in Example 1 by using polyethylene terephthalate as the core part, and using a polyester resin for a binder of the sheath part, the polyester resin including terephthalic acid as the acid component and 42.5 mol % of 2-methyl-1,3-propanediol and 57.5 mol % of ethylene glycol as the diol components.

Measuring Physical Properties of a Polyester Resin

After measuring softening points, glass transition temperatures (Tg), intrinsic viscosities (IV), and melt viscosities of the polyester resins for the binders of the sheath part manufactured in Examples 1 to 6 and the polyester resins for the binders of the sheath part used in Comparative Examples 1 and 2, measurement results are shown in Table 1.

(1) Measuring Softening Points (or Melting Points) and Glass Transition Temperatures (Tg)

Glass transition temperatures (Tg) of copolymerized polyester resins were measured by using a differential scanning calorimeter (Perkin Elmer, DSC-7), and softening behaviors were measured in a TMA mode by using a dynamic mechanical analyzer (DMA-7, Perkin Elmer).

(2) Measuring Intrinsic Viscosities (IV)

After dissolving polyester resins to a concentration of 0.5 wt % in a solution obtained by mixing phenol with tetrachloroethane at a weight ratio of 1:1, intrinsic viscosities (IV) of the polyester resins dissolved in the solution were measured at 35° C. by using Ubbelohde viscometer.

(3) Measuring Melt Viscosities

After melting polyester resins to a measurement temperature, melt viscosities of the melted polyester resins were measured by using RDA III (Rheometric Dynamic Analyzer) of Rheometric Scientific Inc. Specifically, when performing a measurement process by setting from Initial Frequency=1.0 rad/s to Final Frequency=500.0 rad/s under frequency sweep conditions at a set temperature, values at 100 rad/s were calculated into melt viscosities.

TABLE 1

| Classification | Softening point (° C.) | Tg (° C.) | IV (dl/g) | 2-methyl-1,3-pentanediol (mol %) | Melt viscosity | | |
|---|---|---|---|---|---|---|---|
| | | | | | 220° C. | 240° C. | 260° C. |
| Example 1 | 122 | 60.9 | 0.561 | 0.1 | 1254 | 1019 | 783 |
| Example 2 | 115 | 61.8 | 0.562 | 0.5 | 1314 | 1078 | 864 |
| Example 3 | 120 | 61.9 | 0.562 | 1.0 | 1528 | 1387 | 1196 |
| Example 4 | 123 | 63.5 | 0.562 | 2.0 | 2271 | 1739 | 1444 |
| Example 5 | 123 | 64.8 | 0.563 | 3.5 | 2833 | 2571 | 2213 |
| Example 6 | 126 | 67.3 | 0.561 | 5.0 | 3341 | 3041 | 2733 |
| Comparative Example 1 | 113 | 56.8 | 0.563 | 0 | 1011 | 739 | 467 |
| Comparative Example 2 | 121 | 61.5 | 0.561 | 0 | 1197 | 992 | 664 |

As shown in Table 1, it can be seen that melt viscosities are increased as contents of 2-methyl-1,3-pentanediol are increased, and it can be seen that Examples to 6 all maintain high melt viscosities at high temperatures by having melt viscosities at 260° C. of 700 poises or more. Further, it can be seen that Examples 2 to 4 containing 0.5 to 2 mol % of 2-methyl-1,3-pentanediol in the dial components have a melt viscosity difference of 300 to 500 poises between 220° C. and 260° C. lower than melt viscosity differences of 684 and 674 poises of Comparative Examples 1 and 2.

Further, it can be seen that melt viscosities of Examples 5 and 6 are rapidly increased to a melt viscosity at 260° C. of 2,000 poises or more when 3 mol % or more of 2-methyl-1,3-pentanediol is contained in the diol components as in Examples 5 and 6.

Measuring Physical Properties of Fibers

After measuring the following physical properties of polyester fibers for binders manufactured in Examples and Comparative Examples, measurement results are shown in Table 2.

(4) Measuring Compressive Hardness

After opening 5 g of polyester fibers and piling up the opened polyester fibers to a height of 5 cm on a circular molding frame with a diameter of 10 cm, cylindrical shaped molded articles were manufactured by thermally bonding the opened polyester fibers piled up on the molding frame for 90 seconds. Compressive hardness values were measured by compressing the manufactured molded articles as much as 75% through Instron, thereby measuring loads applied to the compression process. The compressive hardness values were measured by performing the thermal bonding process at thermal bonding temperatures of 140° C., 150° C., and 160° C., respectively, in the present experiment.

(5) Measuring Spinning Yields (%, 24 hr)

Spinning yields were calculated by the following equation by measuring amounts of polyester resins used and fibers spun for 24 hours.

Spinning yield(%)=(amount of spun fiber (kg)/ amount of used PET resin(kg))×100

TABLE 2

| Classification | Compressive hardness (kgf) | | | Spinning yield |
|---|---|---|---|---|
| | 140° C. | 150° C. | 160° C. | (%, 24 hr) |
| Example 1 | 0.55 | 0.72 | 0.98 | 98.5 |
| Example 2 | 0.57 | 0.79 | 1.07 | 99.2 |
| Example 3 | 0.62 | 0.88 | 1.21 | 99.3 |
| Example 4 | 0.61 | 1.24 | 1.36 | 99.5 |
| Example 5 | 0.73 | 1.39 | 1.55 | 95.6 |
| Example 6 | 0.76 | 1.54 | 1.86 | 91.3 |
| Comparative Example 1 | 0.41 | 0.57 | 0.74 | 97.8 |
| Comparative Example 2 | 0.52 | 0.73 | 0.91 | 98.1 |

It can be seen that the higher compressive hardness values are, the more excellent thermal adhesive properties between the fibers of molded articles are. Namely, it can be seen that Examples 1 to 6, i.e., a polyester fiber for a binder according to the present invention, are more excellent in thermal adhesive properties than Comparative Examples 1 and 2 by having higher compressive hardness values. Further, it can be seen that Examples 2 to 4 having a low melt viscosity difference between 220° C. and 260° C. also have higher spinning yields than Comparative Examples 1 and 2. Therefore, can be seen that a polyester fiber for a binder according to the present invention is excellent in processability and has improved thermal adhesive properties due to high processability.

Further, it can be seen that spinning yields are lowered since melt viscosities are high when 3 mol % or more of 2-methyl-1,3-pentanediol is contained in the diol components as in Examples 5 and 6.

Particularly, Examples 2 to 4 having 0.5 to 2.0 mol % of 2-methyl-1,3-pentanediol contained in the diol components are very excellent in compressive hardness values and spinning yields. Therefore, it is preferable that 0.5 to 2.0 mol % of 2-methyl-1,3-pentanediol is contained in the diol components.

What is claimed is:

1. A polyester fiber, comprising:
a sheath part; and
a core part, wherein the core part is formed of a polyethylene terephthalate (PET) resin;
wherein the sheath part is formed of polyester resin for a binder, the polyester resin including an acid component comprised of terephthalic acid or an ester-forming derivative thereof and diol components comprised of 2-methyl-1,3-propanediol, 2-methyl-1,3-pentanediol, and ethylene glycol, wherein the 2-methyl-1,3-pentanediol of the polyester resin for the binder is contained in an amount of 0.05 to 2 mol % of a total mole of diols in the diol components, wherein the PET resin of the core part has a melt viscosity at 280° C. of 2,000 to 2,500 poises, and the polyester resin for the binder of the sheath part has a melt viscosity at 260° C. of 600 to 1,500 poises.

2. The polyester fiber of claim 1, wherein the polyester resin for the binder of the sheath part has a melt viscosity at 260° C. of at least 700 poises.

3. The polyester fiber of claim 1, wherein there is a melt viscosity difference of 1,000 to 2,000 poises at 280° C. of the PET resin forming the core part and at 260° C. of the polyester resin for the binder forming the sheath part.

* * * * *